(12) United States Patent
Hwang et al.

(10) Patent No.: US 9,953,738 B2
(45) Date of Patent: Apr. 24, 2018

(54) ELECTROCONDUCTIVE RESIN COMPOSITION AND MOLDED PRODUCT THEREOF

(71) Applicant: Korea Kumho Petrochemical Co., Ltd., Seoul (KR)

(72) Inventors: Ho Soo Hwang, Daejeon (KR); Wan Sung Lee, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 15/472,440

(22) Filed: Mar. 29, 2017

(65) Prior Publication Data

US 2017/0287584 A1 Oct. 5, 2017

(30) Foreign Application Priority Data

Mar. 30, 2016 (KR) .................. 10-2016-0038540

(51) Int. Cl.
*H01B 1/04* (2006.01)
*C08K 3/04* (2006.01)
*B82Y 30/00* (2011.01)
*B82Y 40/00* (2011.01)

(52) U.S. Cl.
CPC ............... *H01B 1/04* (2013.01); *C08K 3/04* (2013.01); *B82Y 30/00* (2013.01); *B82Y 40/00* (2013.01); *Y10S 977/752* (2013.01); *Y10S 977/753* (2013.01); *Y10S 977/842* (2013.01); *Y10S 977/932* (2013.01)

(58) Field of Classification Search
CPC . H01B 1/04; C08K 3/04; B82Y 30/00; B82Y 40/00; Y10S 977/752; Y10S 977/753; Y10S 977/842; Y10S 977/932
USPC ........................................... 252/500
See application file for complete search history.

(56) References Cited

U.S. PATENT DOCUMENTS

| 2010/0163795 A1* | 7/2010 | Kim ............ C08K 3/0008 252/299.6 |
| 2011/0155965 A1* | 6/2011 | Shin .............. B82Y 30/00 252/511 |
| 2014/0217331 A1 | 8/2014 | Hata et al. |
| 2014/0356579 A1* | 12/2014 | Shin ............... H01B 1/24 428/156 |
| 2016/0355670 A1* | 12/2016 | Lee ................ C08K 3/04 |

FOREIGN PATENT DOCUMENTS

| KR | 10-2011-0078205 | 7/2011 |
| KR | 2014-0141145 | 12/2014 |
| KR | 20150133421 A * | 11/2015 |
| WO | 2013/047796 | 4/2013 |

* cited by examiner

*Primary Examiner* — Mark Kopec
*Assistant Examiner* — Danny N Kang
(74) *Attorney, Agent, or Firm* — H.C. Park & Associates, PLC

(57) ABSTRACT

An electroconductive resin composition and a molded product thereof. The electroconductive resin includes 100 parts by weight of a thermoplastic polymer resin; 0.5 to 5 parts by weight of a carbon nanotube aggregate formed of a plurality of carbon nanotubes having an average outer diameter of 8 to 50 nm and an average inner diameter that is 40% or more of the average outer diameter; and 5 to 15 parts by weight of carbon black.

16 Claims, 2 Drawing Sheets

ELECTROCONDUCTIVE RESIN COMPOSITION AND MOLDED PRODUCT THEREOF

CROSS-REFERENCE TO RELATED APPLICATION

This application claims priority to and the benefit of Korean Patent Application No. 10-2016-0038540, filed on Mar. 30, 2016, the disclosure of which is incorporated herein by reference in its entirety.

BACKGROUND

Field

Exemplary embodiments relate to an electroconductive resin composition and a molded product thereof.

Discussion of the Background

Carbon nanotubes are materials that have geometrical features of diameters ranging from several nanometers to several tens of nanometers and high aspect ratios. Carbon nanotubes are composed of only $sp^2$ bonds between carbon atoms. Thus, carbon nanotubes exhibit excellent mechanical strength, electrical conductivity, and thermal conductivity. Research and development on the carbon nanotubes continues to be actively conducted.

Applications of carbon nanotubes may be broadly divided into high strength/lightweight applications, electroconductive/thermoconductive applications, and environmental/energy applications. Among them, examples of the high strength/lightweight applications include automobile parts, wind turbine blades, aluminum wheels, airplane parts, and the like. Examples of electric conductive/thermoconductive applications include semiconductor trays, conductive paints, transparent electrodes, electronic circuits, heat dissipation parts, surface heating elements, electromagnetic shielding materials, tires, and the like.

Further, a composite resin composed of a main resin and carbon nanotubes and/or carbon black is used as an electroconductive resin. The range of the surface resistance suitable for the electroconductive resin is in the range of $10^4$ to $10^6$ Ω/sq. In order to satisfy this requirement, the carbon nanotubes and/or carbon black should be used in excess, specifically, in an amount of 25 wt % or more. Here, there are problems in that the mechanical properties of a molded product formed from a resin are lowered and the surface of a molded product is contaminated due to carbon dust when being abraded.

Accordingly, a method of using electroconductive carbon black instead of ordinary carbon black has been proposed to reduce the content of carbon nanotubes and/or carbon black in the composite resin, but the electroconductive carbon black is more expensive than the ordinary carbon black, resulting in an increase in the cost of the molded product.

Korean Patent Publication No. 10-2011-0078205 discloses an electroconductive resin composition including a polycarbonate, a styrenic copolymer resin, a carbon nanotube, and carbon black. The resin composition is intended to prevent the surface contamination of a molded product and to enhance price competitiveness by replacing a part of the carbon black with carbon nanotubes. However, since the specific gravity of the resin composition is increased due to the polycarbonate used as a main resin, the productivity of the molded product is lowered.

The above information disclosed in this Background section is only for enhancement of understanding of the background of the inventive concept of this application. Therefore, this Background section may contain information that does not form prior art that is already known to a person of ordinary skill in the art.

SUMMARY

Exemplary embodiments of the inventive concepts solve the above-described problems. Therefore an object of the exemplary embodiments is to provide an electroconductive resin composition allowing a molded product to have enhanced and suitable surface properties, mechanical properties, and electrical conductivity, and having productivity improved by lowering a specific gravity of the composition.

The Exemplary embodiments provide an electroconductive resin composition, including: 100 parts by weight of a thermoplastic polymer resin; 0.5 to 5 parts by weight of a carbon nanotube aggregate formed of a plurality of carbon nanotubes having an average outer diameter of 8 to 50 nm and an average inner diameter which is 40% or more of the average outer diameter; and 5 to 15 parts by weight of carbon black.

In an exemplary embodiment, a Raman spectroscopy intensity ratio ($I_D/I_G$) of the plurality of carbon nanotubes may be 1.0 or more.

In an exemplary embodiment, a carbon purity of the plurality of carbon nanotubes may be 95% or more.

In an exemplary embodiment, an average bundle diameter of the carbon nanotube aggregate may be in a range of 1 to 10 μm.

In an exemplary embodiment, an average bundle length of the carbon nanotube aggregate may be in a range of 10 to 100 μm.

In an exemplary embodiment, the thermoplastic polymer resin may include a first styrene-butadiene copolymer having an average particle diameter of 1 to 5 μm.

In an exemplary embodiment, the thermoplastic polymer resin further may include a second styrene-butadiene copolymer having an average particle diameter of 0.1 to 1 μm.

In an exemplary embodiment, a content of the second styrene-butadiene copolymer may be in a range of 10 to 50 wt % based on the total weight of the thermoplastic polymer resin.

In an exemplary embodiment, the electroconductive resin composition may further include 1 to 15 parts by weight of a rubber component.

In an exemplary embodiment, the rubber component may be one or more selected from the group consisting of butadiene rubber, isoprene rubber, styrene-butadiene-styrene rubber, styrene-isoprene-styrene rubber, acrylonitrile-butadiene rubber, styrene-butadiene rubber, and ethylene-propylene rubber.

In an exemplary embodiment, the thermoplastic polymer resin may further include polystyrene.

In an exemplary embodiment, a content of the polystyrene may be in a range of 5 to 20 wt % based on the total weight of the thermoplastic polymer resin.

In an exemplary embodiment, a tensile strength of the polystyrene may be in a range of 400 to 600 kgf/cm$^2$.

In an exemplary embodiment, a flexural strength of the polystyrene may be in a range of 800 to 1,000 kgf/cm$^2$.

Other exemplary embodiments provide a molded product produced using the above-described electroconductive resin composition.

In an exemplary embodiment, a surface resistance of the molded product may be in a range of $10^4$ to $10^8$ Ω/sq.

In an exemplary embodiment, a specific gravity of the molded product may be in a range of 1.0 to 1.1.

In an exemplary embodiment, the molded product may be a tape reel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept and are incorporated in and constitute a part of this specification illustrate exemplary embodiments or serve, together with the description, to explain principles of the inventive concept.

DETAILED DESCRIPTION OF THE ILLUSTRATED EMBODIMENTS

Figure 1:
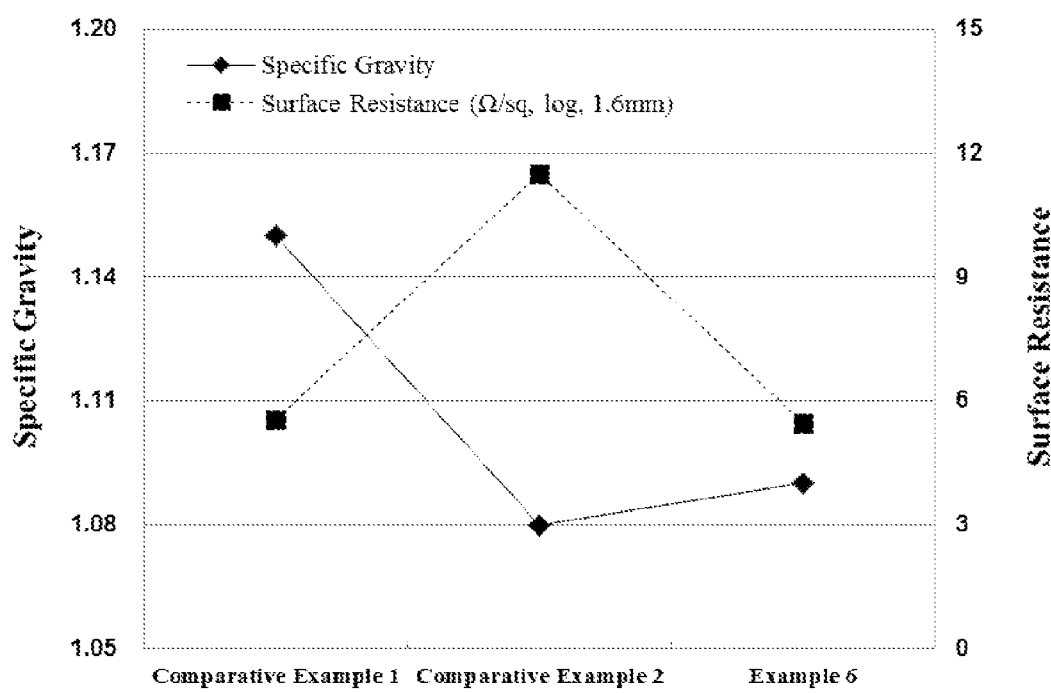
FIG. 1 is a graph showing specific gravity and surface resistance measurements of electroconductive resin compositions according to an example and comparative examples.

Hereinafter, embodiments of the inventive concept will be described in detail with reference to the accompanying drawings. However, exemplary embodiments of the inventive concept may be implemented in several different forms, and are not limited to the exemplary embodiments described herein. In addition, parts irrelevant to description are omitted in the drawings in order to clearly explain exemplary embodiments. Similar parts are denoted by similar reference numerals throughout this specification.

Throughout this specification, when a part is referred to as being "connected" to another part, it includes "directly connected" and "electrically connected" via an intervening part. Further, when a certain part "includes" a certain component, this does not exclude other components from being included unless described otherwise, and other components may in fact be included.

An exemplary embodiment of the inventive concept provides an electroconductive resin composition, including: 100 parts by weight of a thermoplastic polymer resin; 0.5 to 5 parts by weight of a carbon nanotube aggregate formed of a plurality of carbon nanotubes having an average outer diameter of 8 to 50 nm and an average inner diameter which is 40% or more of the average outer diameter; and 5 to 15 parts by weight of carbon black.

The thermoplastic polymer resin is a material forming a main component of the electroconductive resin composition, and may include a first styrene-butadiene copolymer having an average particle diameter of 1 to 5 μm. The term "styrene-butadiene copolymer" used herein refers to general high impact polystyrene (HIPS), and may also be interpreted as a rubber reinforced styrenic copolymer.

The average particle diameter of the first styrene-butadiene copolymer may be in the range of 1 to 5 μm, and the content of butadiene, which is a rubber component, may be in the range of 7.5 to 9 wt % based on the total weight of the copolymer. The first styrene-butadiene copolymer has a relatively large average particle diameter, and may be used in the form of a mixture by adding an excess of mineral oil (about 3 to 5 wt %) thereto as necessary. Thus, first styrene-butadiene copolymer may have high fluidity.

Furthermore, the thermoplastic polymer resin may further include a second styrene-butadiene copolymer having an average particle diameter of 0.1 to 1 μm. The content of butadiene, which is a rubber component of the second styrene-butadiene copolymer, may be in the range of 7.5 to 8.5 wt % based on the total weight of the copolymer. The second styrene-butadiene copolymer has an average particle diameter relatively smaller than that of the first styrene-butadiene copolymer, and may be used in the form of a mixture by adding an excess of mineral oil (about 0.5 to 3 wt %) thereto as necessary. Thus, the second styrene-butadiene copolymer may have high gloss and impact properties.

The content of the second styrene-butadiene copolymer may be in the range of 10 to 50 wt %, and preferably in the range of 20 to 40 wt % based on the total weight of the thermoplastic polymer resin. When the content of the second styrene-butadiene copolymer is less than 10 wt %, the surface and mechanical properties of a molded product may be reduced. When the content of the second styrene-butadiene copolymer is more than 50 wt % (i.e., high), the fluidity of the composition is lowered. This high content of the second styrene-butadiene copolymer decreases the moldability of the thermoplastic polymer resin.

Moreover, the thermoplastic polymer resin may further include polystyrene. The term "polystyrene" used herein refers to a polymer prepared by homopolymerization of styrene monomers. In other words, polystyrene does not include any monomer forming a rubber component except for a styrene monomer. Thus, the polystyrene can impart rigidity, a restoring force, and heat resistance to the thermoplastic polymer resin and the molded product thereof.

In particular, when a molded product formed of the thermoplastic polymer resin is prepared by stacking first molded products molded into a certain shape or by welding them together, the alignment and placement of their edges or sides may be important in order for the molded product to have the desired shape and to maintain specification tolerances in order to prevent stacking failures. For example, a tape reel may require proper parallel placement of the side portions to fix tape. When the parallel placement of the side portions of the tape reel is not maintained and deformed arbitrarily such that an unnecessary inclination occurs, stacking failure or welding failure of disks (first molded products) may occur. Thus, the thermoplastic polymer resin may be further mixed with a certain amount of the polystyrene to impart the required stiffness and restoring force to the tape reel.

The content of the polystyrene may be in the range of 5 to 20 wt % based on the total weight of the thermoplastic polymer resin. When the content of the polystyrene is less than 5 wt %, the required rigidity and heat resistance may not be imparted to the thermoplastic polymer resin and the molded product thereof. When the content of the polystyrene is more than 20 wt %, the content of a rubber component in the resin composition relatively decreases, thereby lowering elongation and impact strength.

The tensile strength and flexural strength of the polystyrene are in the range of 400 to 600 kgf/cm² and 800 to 1,000 kgf/cm², respectively, which are relatively higher than those of the first and second styrene-butadiene copolymers. When the tensile strength and flexural strength of the polystyrene are out of the aforementioned ranges, it is not possible to impart the required stiffness and restoring force to the thermoplastic polymer resin and the molded product thereof.

Carbon nanotubes are used as a material for imparting electrical conductivity to the thermoplastic polymer resin having low electrical conductivity. Electrical conductivity and the resulting antistatic property can be improved by reducing the surface resistance of a product prepared by molding the resin composition to which the carbon nanotubes are added.

Specifically, when the carbon nanotube aggregate is mixed with the thermoplastic polymer resin, each carbon nanotube is dispersed in the thermoplastic polymer resin and connected to each other to form a continuous three-dimensional network structure, thereby exhibiting excellent electrical conductivity.

Although examples of a method of synthesizing the carbon nanotubes include arc-discharge, pyrolysis, laser vaporization, plasma chemical vapor deposition, thermal chemical vapor deposition, and the like, all produced carbon nanotubes may be used regardless of the synthesizing method.

Further, the carbon nanotubes may be one selected from the group consisting of single-walled carbon nanotubes, double-walled carbon nanotubes, multi-walled carbon nanotubes, cup-stacked carbon nanofibers in a form of a hollow tube including a plurality of laminated truncated graphenes, and mixtures of two or more thereof depending on the number of walls, and may be preferably multi-walled carbon nanotubes allowing ease of manufacture and having high economic efficiency, but the present invention is not limited thereto.

The carbon nanotubes may have an average outer diameter of 8 to 50 nm, and an average inner diameter which is 40% or more, preferably, 40 to 90% of the average outer diameter. The outer diameter denotes a diameter of a cross section of carbon nanotubes including a graphite layer forming the wall of carbon nanotubes, and the inner diameter denotes a diameter of a hollow cross section excluding the graphite layer.

Here, when a single strand of the carbon nanotube has an average outer diameter of less than 8 nm or more than 50 nm, the average bundle diameter of a carbon nanotube aggregate formed by agglomeration of the carbon nanotubes may not be adjusted within the range to be described below, and thus it is preferable to use the carbon nanotubes having an outer diameter within the aforementioned range. The term "bundle" used herein refers to a bundle or a rope in which the carbon nanotubes are arranged in parallel or mutually entangled, alternatively, a type of plurality of carbon nanotubes that does not have a specific shape may be referred to as a "non-bundle type".

The bundle-type carbon nanotube aggregate may be basically present in the form of a plurality of carbon nanotubes, and may be preferably in the form of a plurality of multi-walled carbon nanotubes mutually agglomerated.

Each carbon nanotube and an aggregate thereof may have a linear or curved shape or a combination thereof.

Further, when an average inner diameter of a single strand of the carbon nanotube, that is, of a multi-walled carbon nanotube is less than 40% of the average outer diameter, the number of walls of the carbon nanotubes increases to reduce electrical conductivity with the same input amount. Thus, the average inner diameter of the carbon nanotubes may be 40% or more of the average outer diameter.

The carbon nanotube aggregate may be a material formed into a pellet form by mechanical and physical tableting of powder. The carbon nanotube aggregate formed into the pellet form prevents scattering of powder between tasks to improve the working environment.

Further, among the methods for analyzing the structure of the carbon nanotubes, Raman spectroscopy for analyzing the surface state of carbon nanotubes may be particularly useful. The term "Raman spectroscopy" used herein refers to a spectroscopic method for obtaining the vibrational frequencies of the molecules from a Raman effect, which is a phenomenon in which scattered light having differences in frequency corresponding to the vibrational frequencies of the molecule is generated when monochromatic excitation light such as laser light is irradiated. The crystallinity of carbon nanotubes may be quantitatively measured by the above-described Raman spectroscopy.

The peak appeared at a wavenumber of $1580\pm50$ cm$^{-1}$ in the Raman spectrum of carbon nanotubes is called G band, which corresponds to sp$^2$ bonds of carbon nanotubes and is indicative of a carbon crystal free of structural defects. Further, the peak appeared at a wavenumber of $1360\pm50$ cm$^{-1}$ in the Raman spectrum is called D band, which corresponds to sp$^a$ bonds of carbon nanotubes and is indicative of carbon containing structural defects.

Moreover, the peak values of the G band and the D band are referred to as $I_G$ and $I_D$, respectively. The crystallinity of carbon nanotubes may be quantitatively measured by a Raman spectroscopy intensity ratio ($I_G/I_D$), which is the ratio of $I_G$ and $I_D$. Simply put, a higher Raman spectroscopy intensity ratio indicates carbon nanotubes with fewer structural defects. Therefore, when carbon nanotubes having a high Raman spectroscopy intensity ratio are used, the carbon nanotubes have improved electrical conductivity.

Specifically, the Raman spectroscopy intensity ratio of ($I_G/I_D$) of the carbon nanotubes may be 1.0 or more. When the $I_G/I_D$ value of the carbon nanotubes is less than 1.0, the crystallinity of the carbon nanotubes is poor due to containing a large amount of amorphous carbon. Thus, the effect of improving electrical conductivity may be insignificant when the carbon nanotubes are mixed with the thermoplastic polymer resin.

Furthermore, since carbon nanotubes with a higher carbon content can exhibit excellent electrical conductivity due to containing less impurities, such as catalysts, the carbon purity of the carbon nanotubes may be 95% (wt %) or more, preferably in the range of 95 to 98% (wt %), and more preferably in the range of 95 to 97% (wt %).

When the carbon purity of the carbon nanotubes is less than 95%, structural defects of carbon nanotubes are induced to reduce the crystallinity thereof, and the carbon nanotubes may be easily cut and destroyed by an external stimulus.

Further, a carbon nanotube aggregate formed by aggregating the single-stranded carbon nanotubes into a bundle may have an average bundle diameter of 1 to 10 μm, preferably 1 to 5 μm, and more preferably 2 to 4 μm, and may have an average bundle length of 10 to 100 μm, preferably 20 to 60 μm, and more preferably 25 to 55 μm.

When the average bundle diameter of the carbon nanotube aggregate is less than 1 μm or the average bundle length thereof is more than 100 μm, dispersibility is lowered and the electrical conductivity of each part of the electroconductive resin composition may be non-uniform. When the average bundle diameter is more than 10 μm or the average bundle length is less than 10 μm, a network structure may become unstable and electrical conductivity may be reduced.

The content of the carbon nanotube aggregate in the electroconductive resin composition may be in the range of 0.5 to 5 parts by weight based on 100 parts by weight of the thermoplastic polymer resin. When the content of the carbon nanotube aggregate is less than 0.5 parts by weight, it is not possible to impart sufficient electrical conductivity to the resin composition. When the content is more than 5 parts by weight, the moldability of the resin composition may be deteriorated.

The carbon black can impart electrical conductivity to the electroconductive resin composition and combine with the thermoplastic polymer resin to reinforce mechanical properties of the electroconductive resin composition and the molded product thereof.

The content of the carbon black in the electroconductive resin composition may be in the range of 5 to 15 parts by weight based on 100 parts by weight of the thermoplastic polymer resin. When the content of the carbon black is less than 5 parts by weight, it is difficult to implement the aforementioned effect. When the content is more than 15 parts by weight, the mechanical properties of the molded product may deteriorate, the surface of the molded product may be contaminated due to carbon dust when abraded, and the specific gravity of the resin composition may be increased, thereby lowering the productivity of the molded product.

The electroconductive resin composition may further include 1 to 15 parts by weight of a rubber component. The rubber component can improve the elongation and impact strength of the electroconductive resin composition and the molded product thereof by supplementing the hardness properties of the thermoplastic polymer resin.

The rubber component may be one or more selected from the group consisting of butadiene rubber, isoprene rubber, styrene-butadiene-styrene rubber, styrene-isoprene-styrene rubber, acrylonitrile-butadiene rubber, styrene-butadiene rubber, and ethylene-propylene rubber, and is preferably styrene-butadiene-styrene rubber, but is not limited thereto.

As such, the thermoplastic resin composition (the first and second styrene-butadiene copolymers and polystyrene) and the rubber component of the electroconductive resin composition each have different properties and functions, but can realize a synergistic effect of improving both of the moldability and mechanical properties of the electroconductive resin composition when they are combined with each other.

Particularly, in spite of containing a certain amount of high-stiffness polystyrene, the electroconductive resin composition has a melt index, elongation and tensile strength similar to those of the first and second styrene-butadiene copolymers, which are general high impact polystyrenes (HIPS). Thus, the electroconductive resin composition has improved flexibility and moldability.

Furthermore, as compared with the case in which only carbon black is used for imparting electrical conductivity, the electroconductive resin composition can reduce the weight of the molded product and improve productivity by lowering the specific gravity of the resin composition to 1.0 to 1.1 when the molded product is produced under the same conditions as that of the above-described case.

Further, the surface resistance of the molded product produced using the electroconductive resin composition may be in the range of $10^4$ to $10^8$ Ω/sq. The molded product having the surface resistance within the range described above is applicable to a variety of fields such as semiconductor trays, conductive paints, transparent electrodes, electronic circuits, heat dissipation parts, surface heating elements, tape reels, electromagnetic shielding materials, etc. Particularly, the electroconductive resin composition can maximize its effect when applied to a thin molded product which is required to have a certain level of rigidity and reduced weight in addition to moldability and mechanical properties, for example, such as side portions of the tape reel.

Hereinafter, examples of the inventive concept will be described in detail.

EXAMPLES AND COMPARATIVE EXAMPLES

A mixture was mixed in a mixer for 10 minutes according to the composition ratios shown in Table 1 below, extruded using a twin screw extruder, and samples for measuring physical properties were prepared using an injection machine.

TABLE 1

| Classification | P1 | P2 | P3 | R | CNT1 | CNT2 | CB | Additive |
|---|---|---|---|---|---|---|---|---|
| Comparative Example 1 | 100.0 | — | — | — | — | — | 30.0 | 1.9 |
| Comparative Example 2 | 100.0 | — | — | — | — | 1.2 | 10.0 | 1.9 |
| Example 1 | 100.0 | — | — | — | 1.2 | — | 10.0 | 1.9 |
| Example 2 | 100.0 | — | — | 5.0 | 1.2 | — | 10.0 | 1.9 |
| Example 3 | 60.0 | 40.0 | — | 5.0 | 1.2 | — | 10.0 | 1.9 |
| Example 4 | 60.0 | 40.0 | — | 6.5 | 1.2 | — | 10.0 | 2.4 |
| Example 5 | 60.0 | 40.0 | — | 6.5 | 1.2 | — | 14.0 | 2.4 |
| Example 6 | 60.0 | 30.0 | 10.0 | 6.5 | 1.4 | — | 14.0 | 1.5 |

(Units: parts by weight)

The specifications of the thermoplastic polymer resin and other raw materials used are as follows.

TABLE 2

| Classification | P1 | P2 | P3 |
|---|---|---|---|
| Main resin | Styrene-butadiene copolymer | Styrene-butadiene copolymer | Polystyrene |
| Average particle diameter (μm) | 3-4 | 0.5-1.0 | — |
| Rubber (wt %) | 8.3 | 8.0 | — |
| Mineral oil (wt %) | 4.3 | 1.0 | — |
| Tensile strength (kgf/cm², 6 mm) | 260 | 370 | 540 |
| Elongation (%, 6 mm) | 40 | 55 | 3.5 |
| Impact strength (kg · cm/cm, 3.2 mm) | 9 | 12 | 1.5 |
| Melt index (g/10 min, 200° C., 5 kg) | 9 | 4 | 3 |
| Flexural strength (kgf/cm², 2.8 mm) | 300 | 500 | 890 |

R: styrene-butadiene-styrene (SBS) rubber
CNT1: a material which is formed into a pellet form by pelletizing bundle-type multi-walled carbon nanotube (MWCNT) powder with an average bundle diameter of 3.4 μm and an average bundle length of 50 μm prepared by agglomerating a plurality of MWCNTs having an average outer diameter of 16.4 nm, an average inner diameter of 8.0 nm, a Raman spectroscopy intensity ratio of 1.25, and a carbon purity of 96.5%.
CNT2: a material which is formed into pellet form by pelletizing bundle-type multi-walled carbon nanotube (MWCNT) powder with an average bundle diameter of 2.8 μm and an average bundle length of 26 μm prepared by agglomerating a plurality of MWCNTs having an average outer diameter of 12.9 nm, an average inner diameter of 5.1 nm, a Raman spectroscopy intensity ratio of 0.8, and a carbon purity of 95%.
CB: carbon black (CCK 7067, manufactured by Columbian Chemicals Company)

Experimental Example: Measurement of Physical Properties for Electroconductive Resin Composition The mechanical and physical properties of each of the samples prepared according to the above examples and comparative examples were measured, and the results are shown in Table 3 and FIGS. 1 and 2

TABLE 3

| Classification | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|
| Tensile strength (kgf/cm$^2$, 6 mm) | 270 | 216 | 226 | 212 | 226 | 226 | 241 | 262 |
| Elongation (%, 6 mm) | 7 | 14 | 13 | 19 | 17 | 20 | 33 | 31 |
| Impact strength (kg · cm/cm, 3.2 mm) | 10 | 2.7 | 2.2 | 3.6 | 5.1 | 6.6 | 5.9 | 5.0 |
| Melt index (g/10 min, 200° C., 5 kg) | — | 6.8 | 5.5 | 4.9 | 3.7 | 3.9 | 3.4 | 2.4 |
| Specific gravity | 1.15 | 1.08 | 1.08 | 1.07 | 1.08 | 1.08 | 1.09 | 1.09 |
| Surface resistance (Ω/sq, log, 1.6 mm) | 5.5-5.6 | 11-12 | 8-9 | 7.5-8.5 | 8-9 | 7-8 | 6-6.5 | 5.4-5.5 |
| Surface resistance (Ω/sq, log, 3.2 mm) | 4.9-5.2 | 9.2-9.5 | 6.4-6.5 | 5.5-5.6 | 5.8-5.9 | 5.5-5.6 | 5.2 | 4.6-4.7 |

Referring to Tables 2 and 3, the mechanical properties, surface resistance, and specific gravity of Examples 1 to 6 (i.e., Ex. 1 to 6) were more balanced compared with those of Comparative Examples 1 to 2 (i.e., Comp. Ex. 1 to 2). Particularly, in the case of Example 6, it can be seen that the tensile strength, elongation and melt index are similar to those of P1 (HIPS), which is one of the raw materials. Thus, the molded product having excellent and improved flexibility, strength, moldability and appearance characteristics can be obtained. Furthermore, when the specific gravities of Examples 1 to 6 and Comparative Example 1 are compared, the specific gravity of Examples 1 to 6 is relatively low, and thus the weight of the molded product can be reduced and productivity can be improved.

Further, when surface resistances of Examples 1 to 6 and Comparative Example 2 are compared, the surface resistance of Comparative Example 2 is in the range of 9.2 to 12 Ω/sq(log) while the surface resistance of Examples 1 to 6 is in the range of about 4.6 to 9 Ω/sq(log) which is relatively low, and thus the electrical conductivity and the resulting antistatic property required for the electroconductive resin composition or the molded product thereof such as a tape reel can be sufficiently imparted.

FIG. 1 is a graph showing specific gravity and surface resistance measurements of electroconductive resin compositions according to an example and comparative examples.

Referring to FIG. 1, the electroconductive resin composition of Comparative Example 1 has a surface resistance similar to that of Example 6, but has a specific gravity about 5.5% higher than that of Example 6. Thus, the electroconductive resin composition of Comparative Example 1 is expected to have low productivity compared to Example 6. Furthermore, the electroconductive resin composition of Comparative Example 2 has a specific gravity similar to that of Example 6, but the surface resistance is out of the range required for the electroconductive resin composition. Thus, the electroconductive resin composition of Comparative Example 2 is unable to impart the electrical conductivity required for a molded product, for example, a tape reel.

Put another way, the electroconductive resin composition of Example 6 can impart sufficient electrical conductivity to the molded product due to having a surface resistance of 4.6 to 5.5 Ω/sq(log), and has a specific gravity of 1.09, which is lower than that of a comparative example. Thus the production amount of the molded product can be increased when the molded products are injected under the same conditions, and realize a lightweight molded product.

Figure 2A:
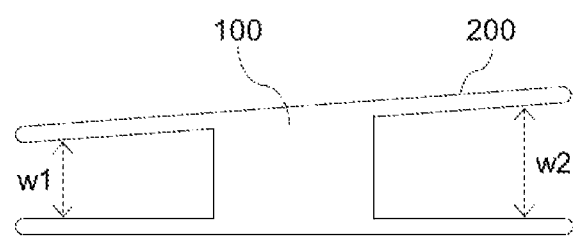
FIG. 2A and FIG. 2B are schematic diagrams comparing restoring properties of molded products (tape reels) according to exemplary embodiments.
Figure 2B:
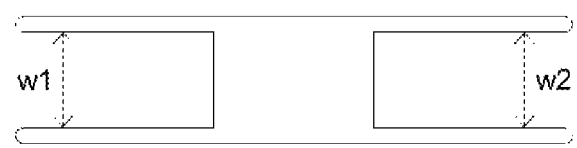

FIG. 2A and FIG. 2B are schematic diagrams comparing restoring properties of molded products (tape reels) according to exemplary embodiments. Referring to FIG. 2A, a tape reel manufactured with the composition of Example 5 has different widths w1 and w2 at both ends of the side portion 200 with respect to the center portion 100 because the restoring force of the side portion 200 is weak. On the other hand, referring to FIG. 2B, a tape reel manufactured with the composition of Example 6 has the same widths w1 and w2 at both ends of the side portion 200 with respect to the center portion 100. When the widths w1 and w2 at both ends of the side portion 200 are different, as in Example 5, stacking failure may occur in the manufacture of a tape reel.

As such, when the electroconductive resin composition contains a certain amount of polystyrene, the tradeoff between the specific gravity and the surface resistance is overcome and an appropriate restoring force is imparted to the side portion 200 of the tape reel to prevent the stacking failure and improve the reliability of the molded product.

The electroconductive resin composition according to an aspect of the present invention includes a carbon nanotube aggregate of which the diameter, length, crystallinity and shape are adjusted within a certain range and carbon black, and thus the moldability, mechanical properties and electrical conductivity of the composition can be improved.

Furthermore, the electroconductive resin composition includes a certain amount of polystyrene to lower the specific gravity of the composition and increase the fluidity of the composition to enhance productivity.

However, the effects of the present invention are not limited to the above-described effects and it should be understood that it includes all effects that can be derived from the configuration of the inventive concept disclosed in the detailed description or claims.

The above description is only exemplary, and it will be understood by those skilled in the art that the invention may be performed in other concrete forms without changing the technological scope and essential features. Therefore, the above-described exemplary embodiments should be considered as only exemplary in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims, and encompasses all modifications or alterations derived from meanings, the scope and equivalents of the appended claims.

What is claimed is:

1. An electroconductive resin composition, comprising:
   100 parts by weight of a thermoplastic polymer resin;
   0.5 to 5 parts by weight of a carbon nanotube aggregate formed of a plurality of carbon nanotubes having an average outer diameter of 8 to 50 nm and an average inner diameter that is 40% or more of the average outer diameter; and
   5 to 15 parts by weight of carbon black,
   wherein the thermoplastic polymer resin further comprises polystyrene, and
   wherein a content of the polystyrene is in a range of 5 to 20 wt % based on a total weight of the thermoplastic polymer resin.

2. The electroconductive resin composition of claim 1, wherein a Raman spectroscopy intensity ratio ($I_G/I_D$) of the plurality of carbon nanotubes is 1.0 or more.

3. The electroconductive resin composition of claim 1, wherein a carbon purity of the plurality of carbon nanotubes is 95% or more.

4. The electroconductive resin composition of claim 1, wherein an average bundle diameter of the carbon nanotube aggregate is in a range of 1 to 10 µm.

5. The electroconductive resin composition of claim 1, wherein an average bundle length of the carbon nanotube aggregate is in a range of 10 to 100 µm.

6. The electroconductive resin composition of claim 1, wherein the thermoplastic polymer resin comprises a first styrene-butadiene copolymer having an average particle diameter of 1 to 5 µm.

7. The electroconductive resin composition of claim 6, wherein the thermoplastic polymer resin further comprises a second styrene-butadiene copolymer having an average particle diameter of 0.1 to 1 µm.

8. The electroconductive resin composition of claim 7, wherein a content of the second styrene-butadiene copolymer is in a range of 10 to 50 wt % based on a total weight of the thermoplastic polymer resin.

9. The electroconductive resin composition of claim 1, wherein the electroconductive resin composition further comprises 1 to 15 parts by weight of a rubber component.

10. The electroconductive resin composition of claim 9, wherein the rubber component comprises one or more rubbers selected from the group consisting of butadiene rubber, isoprene rubber, styrene-butadiene-styrene rubber, styrene-isoprene-styrene rubber, acrylonitrile-butadiene rubber, styrene-butadiene rubber, and ethylene-propylene rubber.

11. The electroconductive resin composition of claim 1, wherein a tensile strength of the polystyrene is in a range of 400 to 600 kgf/cm2.

12. The electroconductive resin composition of claim 1, wherein a flexural strength of the polystyrene is in a range of 800 to 1,000 kgf/cm2.

13. A molded product produced using the electroconductive resin composition of claim 1.

14. The molded product of claim 13, wherein a surface resistance of the molded product is in a range of 104 to 108 Ω/sq.

15. The molded product of claim 13, wherein a specific gravity of the molded product is in a range of 1.0 to 1.1.

16. The molded product of claim 13, wherein the molded product is a tape reel.

* * * * *